United States Patent
Mezaael

(10) Patent No.: US 11,636,410 B2
(45) Date of Patent: Apr. 25, 2023

(54) AUTOMATED CONFIGURATION OF PROVISION OF PRODUCTS AND SERVICES

(71) Applicant: Ford Global Technologies, LLC, Dearborn, MI (US)

(72) Inventor: Abraham Mezaael, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 646 days.

(21) Appl. No.: 16/571,005

(22) Filed: Sep. 13, 2019

(65) Prior Publication Data

US 2021/0081849 A1    Mar. 18, 2021

(51) Int. Cl.
```
G06Q 10/00      (2012.01)
G06Q 50/00      (2012.01)
G06Q 10/0631    (2023.01)
G06Q 10/0835    (2023.01)
G06Q 50/30      (2012.01)
H04L 9/00       (2022.01)
```

(52) U.S. Cl.
CPC . *G06Q 10/063112* (2013.01); *G06Q 10/0631* (2013.01); *G06Q 10/063114* (2013.01); *G06Q 10/08355* (2013.01); *G06Q 50/30* (2013.01); *G06Q 2220/00* (2013.01); *H04L 9/50* (2022.05); *H04L 2209/84* (2013.01)

(58) Field of Classification Search
None
See application file for complete search history.

(56) References Cited

U.S. PATENT DOCUMENTS

| 10,110,541 B2 | 10/2018 | Li |
| 2015/0227890 A1 | 8/2015 | Bednarek et al. |
| 2018/0253805 A1 | 9/2018 | Kelly et al. |
| 2019/0190926 A1* | 6/2019 | Choi .................. H04L 63/1416 |
| 2020/0311120 A1* | 10/2020 | Zhao ................. G06F 16/90324 |
| 2021/0042691 A1* | 2/2021 | Saleh .................. H04L 63/0428 |

OTHER PUBLICATIONS

O'Leary, D. E. (2019). Hashtag Commerce:"Order by Tweet". Journal of Information Technology Teaching Cases, 9(1), 26-37. (Year: 2019).*
Robert Allen, "Using Hashtags for Marketing", Smart Insights Digital Marketing, Smart Insights (Marketing Intelligence) Ltd., Jan. 28, 2019, 9 pages.

* cited by examiner

*Primary Examiner* — Hafiz A Kassim
*Assistant Examiner* — Matheus Ribeiro Stivaletti
(74) *Attorney, Agent, or Firm* — Brandon Hicks; Eversheds Sutherland (US) LLP

(57) ABSTRACT

Technologies are provided for automated configuration of delivery of a product or service. The technologies include a vehicular network that can detect job requests for the delivery of a product or service, where the job requests are based on hashtags. Each vehicle in the vehicular network can include an apparatus that can receive request data from a computing system remotely located relative to the vehicle. A first portion of the request data defines a job request which can be detected by the apparatus by validating the request data. The apparatus can then update a ledger record and also can cause other vehicle in the vehicular network to update other respective ledger records. In addition, the apparatus can send a response to the job request to the computing system. The response permits implementing, or managing the implementation, of a transaction corresponding to the job request.

19 Claims, 7 Drawing Sheets

AUTOMATED CONFIGURATION OF PROVISION OF PRODUCTS AND SERVICES

BACKGROUND

Orders for products and services can be provided using a dedicated mobile application in a mobile device. Status and cost information of an order also can be accessed by means of the dedicated client application. This can be particularly practical when products or services are requested from known platforms that provide dedicated mobile applications.

Providing a mobile application to order products and services, however, can require a significant amount of processing power, network bandwidth, mass storage, and/or other computing resources to manage orders, securely store end-user information, and maintain the mobile application (issue updates, provide security patches, etc.). As a result, the number of dedicated mobile applications to order products and services is rather limited.

Therefore, much remains to be improved in conventional technologies for configuring the provision of products and services.

BRIEF DESCRIPTION OF THE DRAWINGS

The accompanying drawings form part of the disclosure and are incorporated into the present specification. The drawings, which are not drawn to scale, illustrate some embodiments of the disclosure. The drawings in conjunction with the description and claims serve to explain, at least in part, various principles, aspects, and practical elements of the disclosure. Some embodiments of the disclosure are described more fully below with reference to the accompanying drawings. However, various aspects and elements of the disclosure can be implemented in many different forms and should not be construed as being limited to the implementations set forth herein. Like numbers refer to like, but not necessarily the same or identical, elements throughout.

DETAILED DESCRIPTION

Overview

The disclosure recognizes and addresses, among other technical challenges, the issue of configuring the provision of products and services. The disclosure provides technologies for automated configuration of provision of products and services. The disclosed technologies permit requesting and receiving a product or service without reliance on a dedicated mobile application. To that end, the disclosed technologies leverage hashtags in a social network platform to determine a request for a product or service, and process the job request by means of a distributed computing platform that includes a vehicular peer network. As a result, the disclosed technologies improve the efficiency and effectiveness of existing computing systems by reducing the use of computing resources that would otherwise be needed by a computing platform to provide and support the operation of the dedicated mobile application.

As is described in greater detail below, the disclosed technologies include a vehicular network that can validate job requests for the provision of a product or service. The job requests are based on hashtags posted in a social media network. The vehicular network permits maintaining records of transactions corresponding to respective job requests. To that, in some embodiments, each vehicle in the vehicular network includes an apparatus. The apparatus can receive request data from a computing system remotely located relative to the vehicle. A first portion of the request data defines a job request for a product or service. The apparatus can detect a job request by validating the request data. The apparatus can then update a ledger record, and also can cause other vehicles in the vehicular network to update other respective ledger records. In addition, the apparatus can send a response to the job request to the computing system. The response permits implementing, or managing the implementation, of a transaction corresponding to the provision of the product or service corresponding to the job request.

While some embodiments of the disclosed technologies are illustrated with reference to a mobile device and an automobile, the disclosure is not so limited. Indeed, the principles and practical elements disclosed herein can be applied to other types of communication devices and vehicles. The communication devices can be embodied in tethered computing devices that can send and receive information (data and/or signaling) wirelessly and/or via a wireline connection. A tethered computing device can include a voice-over-internet-protocol (VoIP) telephone or a two-way communication device. In turn, such vehicles can include aircraft, boats, farm equipment, and the like.

Illustrative Embodiments

Figure 1:
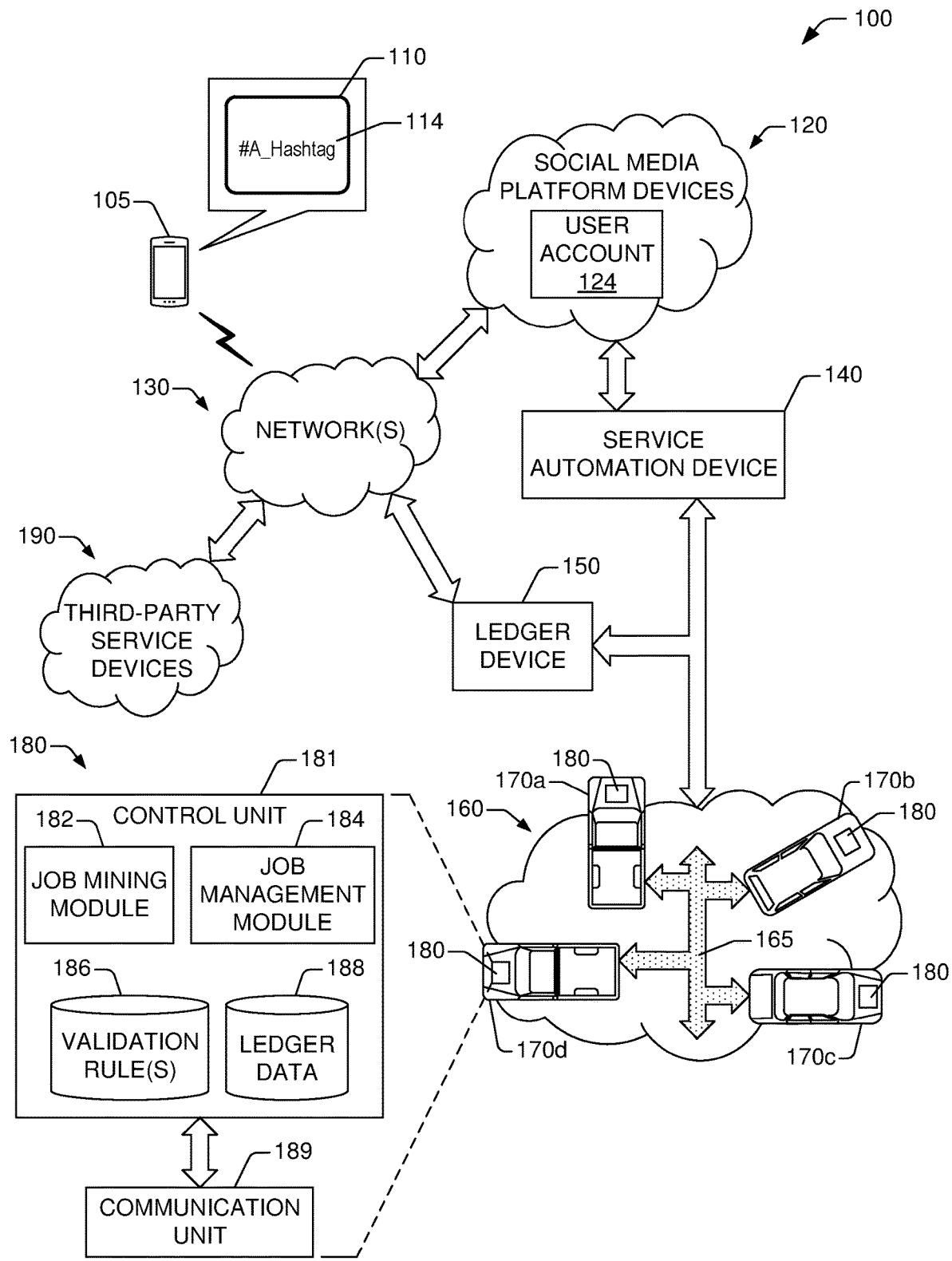
FIG. 1 presents an example of an operational environment for automated configuration of provision of a product or service, in accordance with one or more embodiments of the disclosure.

With reference to the drawings, FIG. 1 illustrates an example of an operational environment 100 for automated configuration of delivery of a product or service, in accordance with one or more embodiments of the disclosure. The exemplified operational environment 100 includes a mobile device 105 that can access a user account within a social media platform (e.g., Facebook, Instagram, twitter, Snapchat, or the like). To that end, the mobile device 105 can include a dedicated software application and/or a web browser application (neither of which applications are depicted in FIG. 1). The mobile device 105 can be embodied in, for example, a mobile tablet computer, an electronic-book reader, a mobile telephone (e.g., a smartphone), and the like. In another example, the mobile device 105 can be embodied, or can include, a wearable computing device, such as a watch, goggles or head-mounted visors, or the like. In yet another example, the mobile device 105 can be embodied in, or can include, portable consumer electronics equipment, such as a camera, a media reproduction device, a portable television set, a gaming console, a navigation device, and the like.

Upon accessing the user account, or after the user account is accessed, the mobile device 105 can provide digital content that can be made available (commonly referred to as being "posted") to other user accounts within the social media platform. The digital content can include text and/or media assets.

To provide such digital content, the mobile device 105 can send data indicative of the digital content to the social media platform. More specifically, the mobile device 105 can send the digital content to at least one device of multiple social media platforms device 120 that form the social media platform. The digital content can be sent via one or many networks 130. Each network that forms the network(s) 130 has a defined footprint and can be a wireless network or a wireline network. The footprint can be, for example, one of a wide area network (WAN), a metropolitan area network (MAN), a local area network (LAN), a home area network (HAN), and/or a personal area network (PAN)). As an example, at least one the network(s) 130 can include a cellular network or a portion thereof and an internet protocol (IP) multimedia subsystem (IMS) platform.

In some instances, the digital content can be augmented with metadata that permits at least one device of the social media platform devices 120 to process the digital content. The metadata can be posted concurrently with the digital content, according to privacy settings that may be configured for the digital content. Thus, the metadata can be posted publicly or privately on the social media platform. The metadata can include one or many hashtags, for example.

The processing that is afforded by such metadata can include, amongst other operations, categorizing the digital content and/or exposing the digital content to software application or other types of program code (such as application programming interfaces (APIs), libraries, or the like). To that point, the operational environment 100 can include one or more service automation devices 140 (referred to as service automation device 140). that can monitor hashtag activity data pertaining to user accounts within one or many social media platforms. Accordingly, the service automation device 140 can connect to each social media platform for which hashtag activity is to be monitored. For the sake of illustration, connecting to a social media platform can include executing program code that accesses (e.g., queries and receives) digital content exposed by the social media platform, where the digital content includes hashtag(s).

The service automation device 140, in some instances, can monitor hashtag activity data for user accounts that are subscribed to an automation functionality (or an automation service) for automated provision of products and/or services. Such automation functionality can be provided by the service automation device 140. The automation functionality can be accessed by, for example, logically coupling each one of the user accounts to an account in the social media platform, where the account corresponds to the service automation device 140. Such a type of coupling can be referred to as "following" the account. In another example, the automation functionality can be accessed by directly coupling each one of the user accounts to the service automation device 140 via, for example, a sign-up process. Regardless of the manner in which the automation functionality is accessed, the user account acknowledges the functionality and can be made aware that every posted hashtag can be monitored and accessed by the service automation device 140.

In instances in which the automation functionality is not accessed, the service automation device 140 can monitor and/or access hashtag activity data originating in digital content that the user accounts post publicly.

Figure 2:
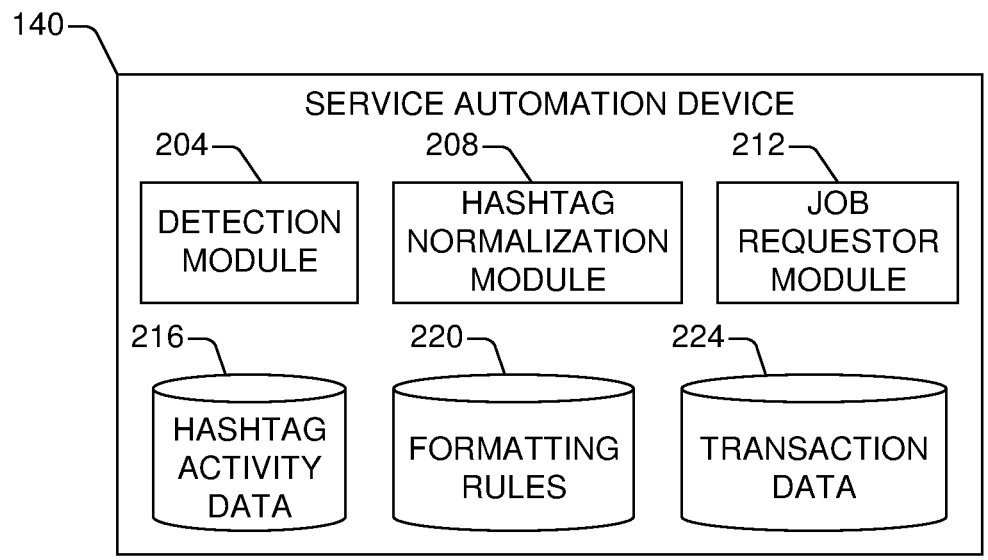
FIG. 2 presents an example of a computing device for automated configuration of provision of a product or service, in accordance with one or more embodiments of the disclosure.

To monitor hashtag activity data for a user account 124 that is either subscribed to the automation functionality or that posts digital content publicly, the service automation device 140 can access digital content posted by the user account 124 in a social media platform and can search for hashtags that may be present in such content. As such, in one configuration, the service automation device 140 can filter the digital content posted by the user account to identify any number of hashtags that may present in the digital content. In some embodiments, as is illustrated in FIG. 2, the service automation device 140 can include a detection module 204 that can monitor hashtag activity data for the user account. In some embodiments, the detection module 204 can execute program code in order to obtain hashtags from digital media posted in social media. As an illustration, the program code can be embodied in, or can include, a query or a script. The query can be, for example, a JavaScript query or another type of query. The script can be, for example, a crawler component using APIs. In addition, or in other embodiments, the detection module 204 can apply regular expressions to detect a particular type of hashtag within the digital content. The detection module 204 can retain any identified hashtags in one or more memory devices (referred to as hashtag activity data 216) integrated into or otherwise functionally coupled to the service automation device.

In one example scenario, the user account 124 can post digital content in a social media platform via the mobile device 105. To that end, the mobile device 105 can execute (or can continue executing) a dedicated software application or a web browser application (neither of which applications are depicted in FIG. 1). In response, the dedicated software application or web browser application causes the mobile device 105 to present a user interface (UI) 110 that can permit receiving and posting digital content. Some of the posted digital content can include a hashtag 114 (generically depicted as "#A_Hashtag" simply for the sake of illustration). In an instance in which the hashtag 114 is posted publicly in a social media platform, the service automation device 140 can detect the hashtag 114 when connected to the social media platform. In an instance in which the user account is subscribed to the automation functionality provided by the service automation device 140, such a device can detect the hashtag 114 regardless of privacy settings, for example.

The service automation device 140 can utilize at least a portion of hashtag activity data in order to automate the provisioning of a product or a service, or both. To that end, the service automation device 140 can generate job requests based at least on hashtags contained in the hashtag activity data. Specifically, a defined hashtag dictates the type of product or service to be delivered. Thus, the defined hashtag dictates the job type of a job request. The job request represents an intended transaction between a requestor device and a provider entity (a device, a vehicle, a platform, etc.), where the transaction involves the product or service. The product can include, for example, a foodstuff, such as pizza; dry-cleaning items; or the like. The service can include, for example, a rideshare trip; a truck, train, or ship delivery; or the like. Accordingly, in some embodiments, the service automation server 140 can generate a job request as a blockchain transaction.

To generate a job request for a published hashtag (e.g., hashtag 114) detected in the hashtag activity data, the service automation device 140 can normalize the published hashtag. The published hashtag can be normalized by first determining the semantics of the hashtag. To that end, the service automation device 140 can apply one or more formatting rules to the published hashtag, where the formatting rule(s) establish a standardized format. In one configuration, formatting the hashtag in such a manner can include removing specific characters (e.g., underscores), correcting a spelling of at least a portion of the published hashtag, and/or and re-composing the hashtag utilizing only lowercase letters. By reformatting the published hashtag in such a manner, the resulting standardized hashtag can be more suitable for a process that permits determining the semantic meaning of the published hashtag. Standardizing published hashtags accounts for the fact that different published hashtags can have the same semantic meaning despite having different formats. For example, hashtags such as #I_Need_pizza, #INeedPizza, #Need_pizza, #wouldLuvPiza2nite, #pizzaNightIN, and the like, can have the same semantic meaning— "pizza is desired"—even though each one of such hashtags has a distinct format. Such hashtags can be standardized to #IneedPizza, for example. Standardized hashtags can be categorized by types, such as food type, fleet type, delivery type, location type, and the like.

Thus, the service automation device 140 can apply semantic classification to the standardized hashtag to determine a semantic category (or semantic meaning) of such a hashtag. In one embodiment, the service automation device 140 can apply a convolutional neural network (CNN) to determine the semantic category. Other types of classification techniques also can be applied. Continuing with the embodiment illustrated in FIG. 2, the service automation device 140 can include a hashtag normalization module 208 that can reformat a published data according to a standardized format. To that, one or more formatting rules can be retained in one or more memory elements (referred to as formatting rules 220) integrated into or functionally coupled to the service automation device 140.

The service automation device 140 can utilize a semantic category corresponding to a published hashtag (e.g., hashtag 114) to map the published hashtag to a job type. For example, the standardized hashtag #IneedPizza can be classified to fast delivery and food service type of job. In some embodiments, as is illustrated in FIG. 2, the service automation device 140 can include a job requestor module 212 that can map the published hashtag to a job type based at least on a semantic category.

The service automation device 140 can then generate a job request based at least on the job type associated with a detected hashtag for the user account 124. The job request can include, or can be associated with, information necessary to respond to the job request. Thus, the information can include requestor information, such as user data that identifies an end-user that posts the hashtag. The information necessary to respond to the job request also can include job data that characterizes a target transaction represented by the job request. In some embodiments, the job requestor module 212 (FIG. 2) can generate the job request, obtaining the user data and/or job data as is described herein.

The service automation device 140 can access (e.g., request and/or retrieve) at least some of the requestor information from a user profile (not depicted in FIG. 1) that is included in the user account 124 and/or from another portion of the user account 124. In addition, or in other embodiments, the service automation device 140 can access at least some of the requestor information from one or more ledger devices 150 (referred to as ledger device 150). For instance, such requestor information can be retained in one or many memory devices (which can be referred to as a membership ledger) within the ledger 150. The requestor information (e.g., user data) that is accessed from the user profile, another portion of the user account, or the membership ledger can include user name, contact information (telephone number, email address, etc.), payment information, a combination thereof, or the like.

The service automation device 140 also can access at least some of the job data from metadata included in the social media post that includes the detected hashtag. Such job data can include, for example, a timestamp and a targeted location which can be determined by location metadata present in the social media post. The location metadata can represent, for example, coordinates of the mobile device 105 at essentially a time that the detected hashtag is published. Such coordinates can be generated by the mobile device 105 using, in some embodiments, signals from a satellite-based navigation system (e.g., Global Positioning System (GPS) signaling, Global Navigation Satellite System (GLONASS) signaling, or the like). In another example, the location metadata can represent a particular address at which the mobile device 105 published the detected hashtag. In some instances, the particular address can be selected, by the mobile device 105, from a menu of addresses supplied by at least one of the social media platform devices.

Further, as part of generation of the job request, the service automation device 140 can index and encrypt the job request. The job request can be indexed by adding a unique index or another type of identifier (ID) that distinctly identifies the job request. In some configurations, the job requestor 212 can index the job request. In addition to indexing the job request, in some embodiments, the service automation device 140 can encrypt the job request. The job request can be encrypted according to numerous cryptography techniques utilizing private-public key pairs, e.g., symmetric encryption or asymmetric encryption. In some embodiments, the job requestor module 212 (FIG. 2) can encrypt the job request.

By encrypting the job request, the service automation device 140 can maintain confidentiality of any information from the user account 124 that may be included in the job request. Thus, an encrypted job request can secure requestor information (e.g., user data) such as user name, contact information, payment information (e.g., credit card number, expiration date, and/or card verification value or another type of card security code), location information, or any other user account information present in the job request.

It is noted that other mechanisms besides encryption can be implemented in order to maintain user account information private within a job request. In one configuration, the service automation device 140 can generate (via the job requestor module 212 (FIG. 2) for example) a reference code associated with the user account 124 pertaining to a job request. The reference code (numeric or alphanumeric) can maintain the job request anonymous while linking the appropriate user account information to the job request. The service automation device 140 can retain job data and user data corresponding to a job request within one or more memory devices 224 (referred to as transaction data 224 (FIG. 2). The reference code also can be retained in the transaction data 224 and, in some embodiments, the reference code can serve as a database key to the job data and user data. In some configurations, the service automation device 140 can share the reference code with the ledger device 150.

Upon generating the job request, or after the job request is generated, the service automation device 140 can send the job request to the ledger device 150. As mentioned, a job request can represent a blockchain transaction. In one aspect, in response to the job request, the ledger device 150 can augment the job data with price data (e.g., a defined price or a price range) for the target transaction associated with the job request. To that end, in some embodiments, the ledger device 150 can execute program code (e.g., an API or a library of functions) to access the price data from at least one of third-party devices 195. For instance, the ledger device 150 can perform a function call for a function of an API to retrieve or otherwise retrieve the price data. In addition, or in other embodiments, the ledger device 150 can included one or many memory devices (not depicted in FIG. 1) that retain pricing information for different types of job requests. The ledger device 150 can utilize the pricing information to augment the job request with price data. The pricing information can be supplied by one or more of the third-party devices 195.

To identify an entity that can respond to the job request, the ledger device 150 can send the job request to a group of vehicles in a vehicular peer network 160. Each one of the vehicles in the group of vehicles is registered with the service automation device 140, for example, as a member of the vehicular network 160 for the purpose of receiving and operating on job requests. At the time of registration, a vehicle can send vehicle data that identifies the vehicle (e.g., vehicle identification number (VIN), make and model, year, and the like). Such vehicle data also can include an encryption key (e.g., a public key) of the vehicle. The vehicle also can send other vehicle data that conveys preferences for specific types of job requests, or specific periods of time (time of day, time of week, time of the month, specific dates, or the like), and/or locations in which the vehicle is available for processing job requests. The entity can be embodied in, or can include, a third-party service device, and can respond to the job request by implementing a target transaction corresponding to the job request or by managing the implementation of the target transaction. The vehicular peer network 160 includes multiple vehicles, which include driverless autonomous vehicles and/or driver-operated vehicles. In some embodiments, each one of the multiple vehicles can be electric. In other embodiments, each one of the multiple vehicles can rely on an internal combustion engine for locomotion. In yet other embodiments, the multiple vehicles can include electric vehicles and other vehicles having respective internal combustion engines. As is illustrated in FIG. 1, the vehicular peer network 160 can include a first vehicle 170a, a second vehicle 170b, a third vehicle 170c, and a fourth vehicle 170d. The vehicle peer network 160 also can include communication media 165 that permits exchanging data and/or signaling wirelessly between vehicles in the network 160. The communication media 165 can include communication links, base station, and/or multiple network devices (such as server devices, gateway devices, and the like).

Figure 3:
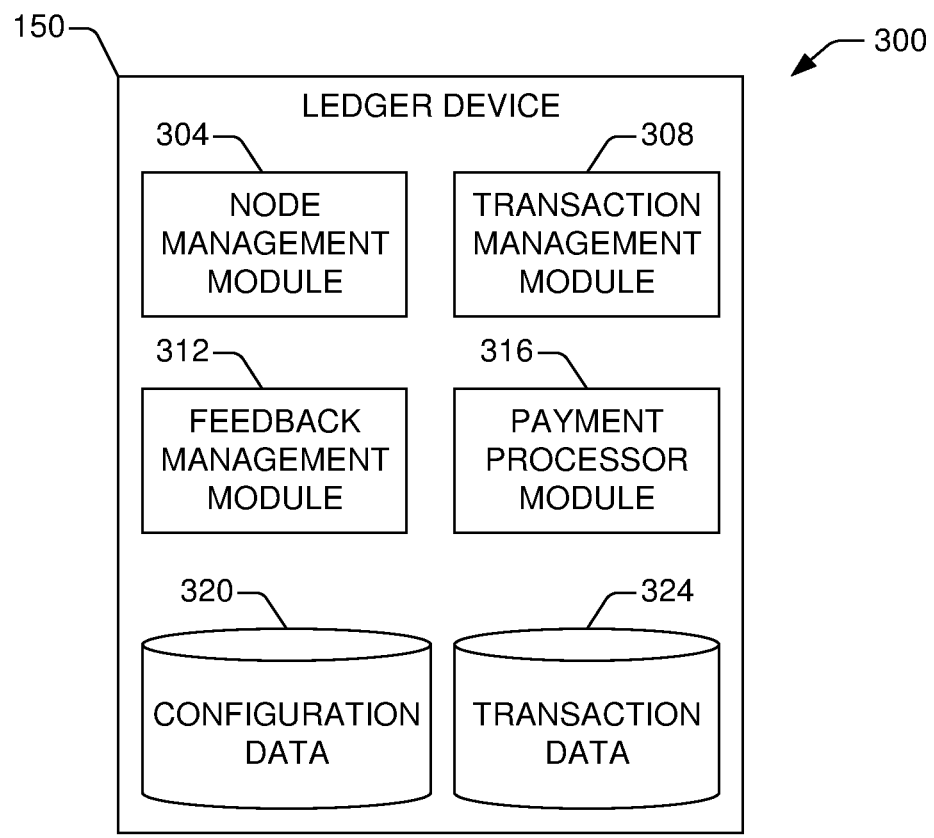
FIG. 3 presents an example of another computing device for automated configuration of provision of a product or service, in accordance with one or more embodiments of this disclosure.

The ledger device 150 can allocate specific types of job requests to specific vehicles in the vehicular network 160, as some vehicles can be configured to receive job requests associated with specific types of hashtags (e.g., food type, fleet type, delivery type, location type, etc.). A vehicle can be configured to receive job requests associated with one or multiples types of hashtags. Thus, the ledger device 150 can maintain configuration data indicative of a mapping between vehicles in types of hashtags. Maintaining the configuration data can include, for example, updating (e.g., creating or changing) records of an association between a vehicle in the vehicular peer network 160 and a type of hashtag, and removing records in response to removal of vehicles from the vehicular peer network 160. In some embodiment, as is illustrated in FIG. 3, the ledger device 150 can include a node management module 312 that can maintain the configuration data in one or more memory devices (referred to as configuration data 320). The configuration data 320 can be integrated into the ledger device 150 or functionally coupled to the ledger device 150.

Accordingly, the ledger device 150 can allocate a job request of a defined type to a specific group of vehicles (e.g., vehicle 170a, vehicle 170b, vehicle 170c, and vehicle 170d) within the vehicular peer network 160. Regardless of the type of job request, each vehicle in the group can operate on a job request essentially concurrently with other vehicles in the group. Such a mode of operation on job requests can be referred to as specificity mode. Each vehicle operates on the job request in an attempt to validate the job request. In some embodiments, a job request can be validated by a vehicle when operating on the job request or on an iteratively modified version of the job request yields a result that satisfies a defined validation criterion. For example, the defined validation criterion can dictate that a hash value generated by operating on data included in the job request must include a group of characters. In one example configuration, the group of defined characters can include a string of contiguous defined characters (e.g., "0000") arranged in a particular portion of the hash value, e.g., at the beginning of the hash value or at the end of the hash value. In another example configuration, the group of defined characters can include a particular sequence of characters (e.g., "01AB") where two or more of the characters in the sequence are interleaved within the hash value.

In other embodiments, the job request can be validated by a vehicle when (a) operating on the job request or on an iteratively modified version of the job request yields a result that satisfies a first validation criterion, and (b) the vehicle satisfies one or more second validation criteria. The first validation criterion can dictate, for example, the type of hash value that must be obtained (e.g., a hash value that includes a defined group of characters as discussed above, in the immediately preceding example configurations). In such embodiments, in response to the vehicle failing to satisfy the one or more second criteria, a second vehicle that generates a hash value satisfying the first validation criterion can be assessed with respect to the one or more second validation criteria. Accordingly, a group of vehicles in the vehicular peer network 160 can continue operating essentially concurrently on the job request until a suitable vehicle in the vehicular peer network 160 satisfies the first validation criterion and the one or more second validation criteria.

The one or more second validation criteria to be satisfied by a vehicle operating on a job request can include, for example, a location criterion, a performance criterion, a pricing criterion, a combination thereof, or the like. As an illustration, the location criterion can establish a threshold tolerance distance for the relative geographic separation between a pair of the vehicle operating on a job request; the mobile device 105 that originated the job request via a hashtag; and a provider location associated with a device of the third-party service devices 195. In one example, the threshold tolerance distance can represent a delivery radius for a product. In an instance in which, for example, the vehicle and the mobile device 105 are geographically separated by less than the threshold tolerance distance, the location criterion can be satisfied. In another instance in which, for example, the mobile device 105 and the provider location are geographically separated by at most the threshold tolerance distance, the location criterion can be satisfied. As another illustration, the performance criterion can establish a threshold time interval for providing a product or performing a service task. Thus, the vehicle can satisfy the performance criterion when the vehicle or a provider related to the vehicle can provide the product or perform the service task within threshold time interval. In yet another illustration, the performance criterion can specify a threshold cargo space that must be available to the vehicle. Such a performance criterion can be configured in scenarios in which the job request involves transporting a product.

In further embodiments, the job request can be validated by a vehicle when (a) operating on the job request or on an iteratively modified version of the job request yields a result that satisfies a first validation criterion, and (b) the vehicle is a satisfactory match, relative to other vehicles, for providing a product or performing a service task corresponding to the job request. In such embodiments, multiple vehicles can generate respective results that satisfy the first validation criterion. Each vehicle of the multiple vehicles can then broadcast, via the communication media 165, information that specifies characteristics and/or operating conditions of the vehicle. Each of the multiple vehicles can utilize at least such information to solve an optimization problem relative to a cost function for providing the product or performing the service task. For instance, the cost function can evaluate a time for delivery of a product and/or can evaluate if sufficient cargo space or other capabilities (temperature-controlled cargo space) are available for transporting the product. The solution to the optimization problem can identify a particular vehicle amongst the multiple vehicles that is a satisfactory match for providing the product or performing the service task. Such a particular vehicle is then the vehicle that validates the job request.

A vehicle that validates the job request can extract user data and/or job data included in the job request. The vehicle can extract the user data and/or the job data by decrypting at least a portion of the job request. To that end, the vehicle can perform a decryption technique consistent with the cryptographic technique utilized to encrypt the user data and the job data. In an example instance in which the service automation device 140 utilizes asymmetric encryption, the vehicle can utilize the private key of the vehicle to decrypt the user data and the job data. In such an instance, the vehicle previously has sent a public key of the vehicle to the service automation device 140, for encryption purposes. Such a public key can be provided to the service automation device 140 at a time the vehicle registers with the service automation device as a member of the vehicular network 160. In embodiments in which the job request includes a reference code instead of job data and user data, the vehicle can send a query to the service automation device 140 using the reference code in order to access the user data and the job data. The service automation device 140 can retain the job data and the user data in the transaction data 224.

Another specific group of vehicles can operate on job requests based on a region or location. Thus, a vehicle in such a group can operate on job requests at times when the vehicle is traversing the region or is otherwise at the location. For instance, the vehicle can operate on job requests of the taxi type, fleet type, trucking type, and/or rideshare type, when the vehicle may be travelling through region of location. Such a mode of operation on job requests can be referred to as location mode. In some situations, vehicles that operate in location mode can provide an opportunistic location-based service by responding to job requests associated with courier-like hashtags. For instance, such vehicles can operate on hashtags representing a request to obtain a specific item (e.g. #INeedLSATPowerScoreBook. Again, each vehicle in such a group operates on a job request in an attempt to validate the job request. The job request can be validated when operating on the job request or on an iteratively modified version of the job request yields a result that satisfies one or more defined validation criteria, in accordance with aspects described herein.

Yet another specific group of vehicles in the vehicular peer network 160 can operate on at least some types of job requests generated by the ledger device 150. In one configuration, one or several vehicles in the group can operate on job requests on a full-time mode. For instance, one such vehicle(s) can operate on job requests while the vehicle(s) is in operation, and another one of such vehicle(s) can operate on jobs requests while charging a battery at a charging station. In another configuration, one or several vehicles in the group can operate on job request on a par-time basis, e.g., during specific periods while operating and/or charging. As is disclosed herein, each vehicle in such a group operates on a job request in an attempt to validate the job request. The job request can be validated when operating on the job request or on an iteratively modified version of the job request yields a result that satisfies one or more defined validation criteria, in accordance with aspects described herein.

To that end, the ledger device 150 can be distributed across different types of hashtags, where different ledger devices that constitute the ledger device 150 generate respective types of job requests (e.g., one main ledger for fast food and services, another for fleet job tasks, other for package delivery, etc.). Depending on business type, this can be expanded to many ledgers where vehicles in the vehicular peer network 160 can provide feedback data appropriately. The feedback data can permit completing an order or service task corresponding to the job request. Thus, feedback data define at least one attribute of a product or the service task. The respective types of the at least one attribute can be specific to the type of job request. The feedback data can include, in some instances, a request for additional information regarding the order or service task. As an illustration, the at least one attribute can include a list of food allergens to be excluded from a requested meal or drink; a size of a requested drink; delivery instructions for a requested package; particular route for transportation of cargo; and the like.

Vehicles configured to operate on a specific hashtag type (or job request type) can be functionally coupled to the ledger device that manages such the hashtag type. Such vehicles also can be functionally coupled to other vehicles in the vehicular peer network 160 that also operate on the hashtag type, in order to send and receive feedback, for example. In some instances, a configuration of a vehicle to operate on a specific job request type can be static, remaining unchanged over time. In other instances, such a configuration can be dynamic, where the vehicle is configured to operate on a first type of jobs requests during a first defined period of time (e.g., during daytime) and on a second type of job requests during a second defined period of time (e.g., during weekends). For instance, the vehicle can operate on job requests pertaining to fleet service during daytime and on job requests for rideshare service during nighttime.

By categorizing vehicles according to type of job request, at least some of the third-party service devices also can be categorized according to specific industry (e.g., food industry, transportation industry, rideshare industry, and the like). Thus, such categorization can create vertical markets for the implementation of automated configuration of the provision of products and/or services. In addition, vehicles within a category can respond to a defined hashtag type and, thus, can more accurately find solutions and can provide focused, more strategic feedback to third-party devices 195 that are included in the category.

Regardless of the mode of operation on job requests—specificity mode, full-mining mode, partial-mining mode, or location mode—a vehicle in the vehicular peer network 160 can include a digital mining apparatus 180 to operate on job requests and provide feedback in response to results of operating on job requests. As is illustrated in FIG. 1, in some embodiments, the digital mining apparatus 180 includes control unit 181 to operate on the job request. The control unit 181 can include a job mining module 182 that can operate on the job request. The job mining module 182 can modify a portion of request data representative of the job request and can apply a cryptographic hash function to the modified request data. The cryptographic hash function can be, for example, one of RIPEMD-160, Secure Hash Algorithm (SHA)-1, SHA-256, or SHA-512. The job mining module 182 can then determine if a resulting hash value satisfies a validation criterion as is described herein. For instance, the validation criterion can dictate a defined number and type of initial characters must be present in the hash value. In some embodiments, the job request is validated when the application of the cryptographic hash function yield a hash value that satisfies the validation criterion. In other embodiments, as is described herein, the job request can be validated when both the hash value satisfying the validation criterion and the vehicle that includes the digital mining apparatus 180 satisfying one or more second validation criteria as is described herein. The job mining module 182 can iteratively modify the request data and apply the cryptographic hash function while searching for request data that validates the job request. The vehicle can respond to a job request by validating the job request. The validation criteria, either applicable to the hash value or the vehicle, can be retained in one or more memory devices 186 (referred to as validation rule(s) 186).

In response to validating the job request, the job mining module 182 can extract the user data and/or job data encrypted in the job request. In addition, the control unit 181 also can include a job management module 184 that can generate a response to the job request. The response can include a response message that includes the extracted user data and/or extracted job data. The response message can identify the job request by using a unique index (or another type of job ID) included in the decrypted job request.

In further response to validating a job request, the digital mining apparatus 180 can broadcast a notification to each one of the other vehicles also operating on the job request within the vehicular peer network 160. The notification can convey that the sender vehicle has validated the job request. The notification also can include transaction data that can permit updating ledger data retained in each one of the vehicles that receive the notification. The job management module 184 can broadcast the notification and can update ledger data retained in the vehicle that successfully decrypted the job request. In some embodiments, the ledger data can be formatted as a blockchain ledger. The ledger data can be retained in one or more memory devices (referred to as ledger data 186) integrated into the control unit 181 or otherwise functionally coupled to the control unit 181.

It is noted that the disclosed technologies are not limited to broadcasting such a notification, Indeed, the digital mining apparatus 180 can transmit the notification to one or several other vehicles according to other communication approaches, such as unicast or multicast. To broadcast or otherwise communicate the notification in response to validating the job request, the digital mining apparatus 180 can include a communication unit 189. The communication unit 189 can include one or many antennas and a communication processing device that can permit wireless communication between a vehicle and either another vehicle or an external device. The other vehicle can be, for example, one of the vehicles included in the vehicular peer network 160. The external device can be one of the ledger device 150 or the service automation device 140, for example. Such a communication processing device can process data according to defined protocols of one or several radio technologies. The data that is processed can be received in a wireless signal or can be generated by the control unit 181. The radio technologies can include, for example, 3G, Long Term Evolution (LTE), LTE-Advanced, 5G, IEEE 802.11, IEEE 802.16, Bluetooth, ZigBee, near-field communication (NFC), and the like.

A vehicle that validates a job request can send the response message to the ledger device 150. In response to receiving the response message, the ledger device 150 can update transaction data to include a record of the validated job request and, in some instances, user data and/or job data received in the response message. The ledger device 150 can maintain records of respective validated job requests received from one or many vehicles within the vehicular peer network 160. Records of validated job requests can be maintained, in one configuration, within ledger data formatted as a blockchain ledger. In some embodiment, as is illustrated in FIG. 3, the ledger device 150 can include a transaction management module 308 that can receive response messages identifying validated job requests. In response to receiving the response messages, the transaction management module 308 can update (e.g., create or augment) transaction data indicative of the validated job requests. The transaction data can be retained in one or more memory devices (referred to as transaction data 324) integrated into the ledger device 150 or functionally coupled to the ledger device 150.

In further response to receiving the response message, the ledger device 150 can identify a provider device that can perform the target transaction corresponding to the received job data. In one example, the ledger device 150 can apply one or several qualification criteria to service provider data in order to select a third-party service device that can perform the target transaction or can manage the performance of the target transaction. The selected third-party service device can be included in a group of third-party service devices 195 that can be registered as service providers with the ledger device 150.

The ledger device 150 can send job data to the selected third-party provider device. In response to receiving the job data, the selected third-party provider device can create an order for a product or a task for a service based on the target transaction. The service can include, for example, taxi service, rideshare service, dispatch service, or the like. In some instances, the selected third-party provider device can send feedback data to the ledger device 150. The feedback data can permit completing an order or service task. Thus, feedback data define at least one attribute of a product or the service task. Feedback data can include a request for additional information from the mobile device 105 regarding the order or service task.

The ledger device 150 can send the feedback data to the mobile device 105. In response, the ledger device 150 can receive second feedback data from the mobile device 105. The second feedback data also can provide information to complete the order or service task based on the target transaction. The ledger device 150 can then send the second feedback data to the selected third-party provider device. In some instances, receiving the second feedback can cause the selected third-party service device to complete the order or task. In an instance in which the order or task is not complete, the ledger device 150 can permit further exchanges of feedback data between the mobile device 105 and the provider device until the order or service task can be completed. In some embodiments, with further reference to FIG. 3, the ledger device can include a feedback management module 312 that can mediate the exchange of feedback data between a third-party service device and the mobile device 105.

As an example, a target transaction can be the delivery of a pizza to a specific location of the mobile device 105. The ledger device 150 can apply a first qualification criterion to determine multiple provider devices capable of managing the delivery of the pizza. The multiple provider devices can be included in the third-party service devices 195. The first qualification criterion can dictate that a suitable provider device must be associated with a pizzeria (a franchised pizza restaurant or a small-business pizza restaurant). The ledger device 150 also can apply a second qualification criterion to select a defined provider device from the multiple provider devices. The second qualification criterion can dictate that a suitable provider device must be located within a defined distance (two miles or five miles, for example) from the location of mobile device 105. Such a location can be specified in the validated job request associated with the target transaction. Thus, by applying the first and second qualification criterion, the ledger device 150 can identify the defined provider device, which can manage the delivery of the pizza.

Further, the ledger device 150 can then send job data representative of the target transaction to the defined provider device. In response to receiving the job data, the defined provider device can create an order for pizza for the mobile device 105. In some instances, the defined provider device also can send feedback data to the ledger device 150. The feedback data can permit specifying the order for the pizza. For instance, the feedback data can represent a group of questions directed to characterizing the desired pizza—e.g., desired pizza toppings, size, other preferences, additional desired foodstuffs or drinks, etc.

Continuing with the example, the ledger device 150, in turn, can send the feedback data to the mobile device 105. In response, the ledger device 150 can receive other feedback data from the mobile device 105. Such feedback data can provide answers to the questions from the defined provider device. The ledger device 150 can then send the other feedback data received from the mobile device 105 to the defined provider device. The order for the pizza can thus be completed. In an instance in which the order is not complete, the ledger device 150 can further permit the exchange of feedback data between the mobile device 105 and the defined provider device until the order for the pizza is complete.

In some embodiments, the ledger device 150 can update at least some of the vehicles in the vehicular peer network 160 with feedback data sent to the mobile device 105 and/or feedback data received from the mobile device 105. In one configuration, the feedback management module 312 (FIG. 3) can update a vehicle in the vehicular peer network 160.

Similarly, each vehicle in the vehicular peer network 160 can send feedback data to the ledger device 150 and, in some instances, to the service automation device 140. To that end, in some embodiments, the job management module 184 can send the feedback data. In one configuration, the job management module 184 can utilize an interface (such as an API) or another type of program code to send the feedback data to the ledger device 150 or the service automation device 140. The feedback data can be sent from the vehicle that includes the control unit 181 to the ledger device 150 or the service automation device by means of the communication unit 189.

The ledger device 150 can process a payment for the performance of a target transaction related to a hashtag (e.g., hashtag 114). To that end, in some instances, the ledger device 150 can receive approval for the processing of the payment from the user account 124 and, in response, the ledger device 150 can execute a payment transaction related to the hashtag. For instance, a payment transaction can be executed in response to delivery of a product (e.g., once pizza is delivered) completion of a task of a service related to the hashtag. In some embodiments, as is illustrated in FIG. 3, the ledger device 150 can include a payment processor module 316 that execute a payment transaction related to a hashtag. The ledger device 150 also can provide status data indicative of a state of performance of the target transaction (e.g., transaction in progress or transaction complete). To that end, the ledger device 150 can access the status data from a third-party service device and/or a vehicle.

Figure 4:
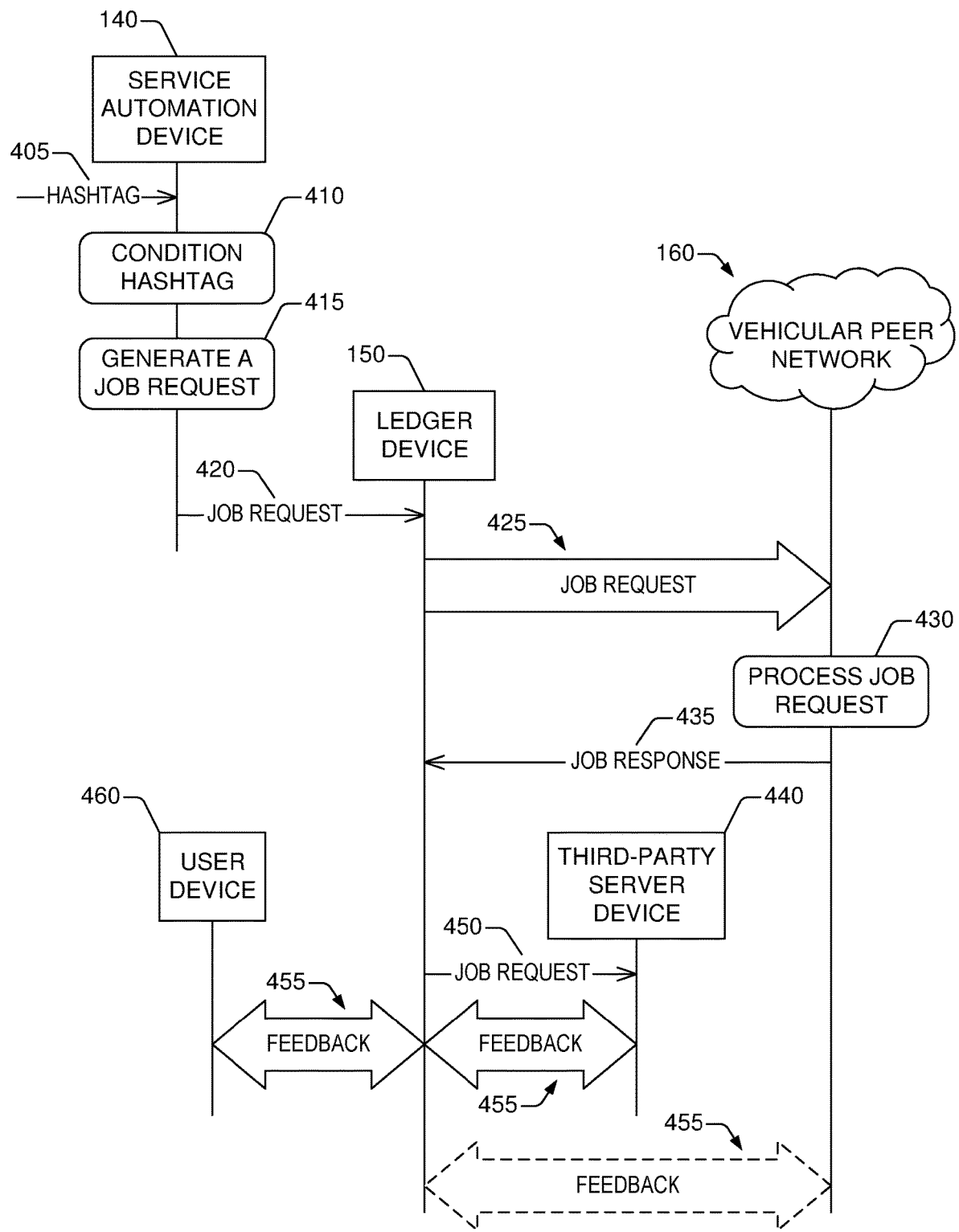
FIG. 4 presents an example of a process within a computing system for an automated configuration of provision of a product or service, in accordance with one or more embodiments of this disclosure.

FIG. 4 presents an example of a process within a computing system for automated configuration of delivery provision of a product or service, in accordance with one or more embodiments of this disclosure. The computing system can be distributed and includes, in some embodiments, the service automation device 140, the ledger device 150, and the vehicular peer network 160. The service automation device 140 can receive data that identifies a hashtag 405. The hashtag 405 can be have different format depending on a desired product or service task. Simply as an illustration, in an instance in which the service task is a taxi ride, the hashtag 405 can be one of #IneedRideToairport@ 130, #needaRide, #NeedRidebackHomeafterDinner, #looking4AridefromDT@2AM, #NeedtogetbacktoHotel, #CantDriveIneedHelp, or the like. As another illustration, in an instance in which the service task corresponds to a dispatch control task for fleet vehicles, the hashtag 405 can be one of #DeliverTOnearestStation, #ReturntoBase, #GoTonearestDealership, #Driver12_Deliver_to_432_Detroit_St_MI, #Driver4_stop_for_a_break, #Driver82_needFuel_by_nextstation, #Vehicle9_go_to_nearest_charging_station, #vehicle43_next_stop_walmart_address, or the like. In another instance in which the service task corresponds to an emergency, the hashtag 405 can be one of #IneedEmergency, #INeedFuel, #IneedaTOW, #IneedTirechange, or the like. In other instances, the hashtag 405 can correspond to an opportunistic location-based service. For example, the hashtag 405 can be #INeedLSATPowerScoreBook.

Accordingly, the service automation device 140 can condition the hashtag at a block 410. Conditioning the hashtag 405 can result in a standardized hashtag (not depicted in FIG. 4). In some embodiments, the block 410 (and other blocks disclosed herein) can include dedicated hardware that can execute instructions to perform the functionality associated with the block 410 (or the other blocks). Such instructions can be assembled as circuitry or other types of hardware components.

Based on the standardized hashtag, the service automation device 140 can generate a job request at block 415. To that end, the service automation device 140 can determine a job category for the standardized hashtag and can generate appropriate user data and job data. The service automation device 140 also can encrypt the job data and/or the user data.

The service automation device 140 can generate a request message 420 (labeled "Job Request," for the sake of nomenclature) that includes the encrypted job data and/or the encrypted user data. The request message represents a target transaction that corresponds to a desired product or service task. The request message 420 can identify the job category associated with the hashtag 405.

The service automation device 140 can send the request message 420 to the ledger device 150. In response to receiving the request message 420, the ledger device 150 can broadcast the request message 420 to multiple vehicles included the vehicular peer network 160. Thus, multiple request messages 425 can be sent to respective ones of the multiple vehicles. The multiple vehicles can process the job request at block 430. The job request can be processed essentially concurrently across the multiple vehicles. As a result, one of such vehicles can send a response message 435 to the ledger device 150. The response message 435 is labeled "Job Response" simply for the sake of nomenclature.

Figure 5:
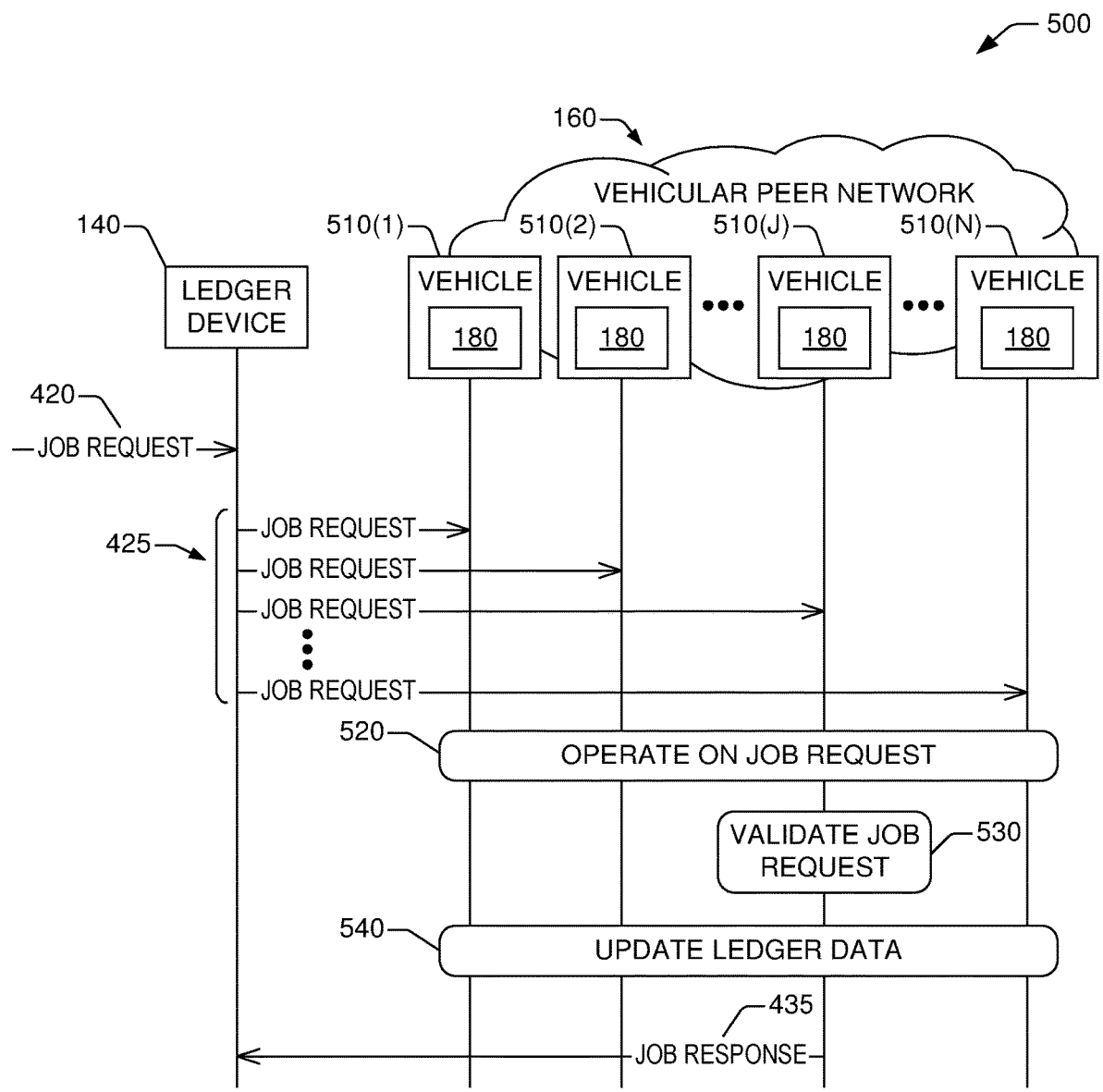
FIG. 5 presents an example of another process within a computing system for automated configuration of provision of a product or service, in accordance with one or more embodiments of this disclosure.

More concretely, in some embodiments, as is illustrated in FIG. 5, the multiple request messages 425 can be sent to N vehicles: vehicle 510(1); vehicle 510(2); . . . ; vehicle 520(J); . . . ; and vehicle 510(N). Here, J and N are natural numbers, where J≥N, and N≥2. In response to receiving the request messages 425, at block 520, the vehicles 510(1)-510(N) operate essentially concurrently on respective ones of the request messages 425. Each one of the vehicles 510(1)-510(N) are registered with the service automation device 140, for example, as a member of the vehicular network 160 for the purposed of receiving and operating on job requests. In some embodiments, the vehicles 510(1)-510(N) can operate on location mode and can provide an opportunistic courier-like service. For example, the vehicles can operate within proximity of library or bookstore and can obtain and deliver books on demand. In other embodiments, the vehicles 510(1)-510(N) can form part of a fleet and can operate on request messages 425 corresponding to dispatch control tasks generated by dispatch coordination device. In one of such embodiments, one or more of the vehicles 510(1)-510(N) can be autonomous vehicles. In yet other embodiments, each one of the vehicles 510(1)-510(N) can be owned (or leased) independently and can operate of a particular type of message request 425. For example, at least one of the vehicles 510(1)-510(N) can be a truck and can supplement transportation services in a city or region where a commercial trucking entity lacks adequate support.

As a result of such an operation, in one example, the vehicle 510(J) can validate the job request received in the request message 420. As is disclosed herein, in some embodiments, the job request can be validated when operating on the job request or on an iteratively modified version of the job request yields a result (such as a hash value) that satisfies a first validation criterion. In other embodiments, the job request can be validated when both (a) operating on the job request or on an iteratively modified version of the job request yields the result that satisfies the first validation criterion (b) the vehicle satisfies one or more second validation criteria.

In response, the vehicle 510(J) can update a first ledger record based at least on the validated job request at block 540. The vehicle 510(J) retains the first ledger record in one or more memory devices (such as the ledger data 186). In some embodiments, the first ledger record can include one or several blocks of data. Updating the first ledger record can thus include, for example, adding a block of data corresponding to the validated job request to the first ledger record. Such an update results in an updated ledger record. In some embodiments, updating the first ledger record can include encrypting at least one of job data or the user data corresponding to the validated job request, and generating such a block of data. The block of data can include the hash value that results from operating on the job request and satisfies the first validation criterion, the block of data also can include one or more of the encrypted job data or the encrypted user data.

In further response to the validation of the job request, the vehicle 510(J) can cause the other vehicles in the group (e.g., vehicle 510(1), vehicle 510(2) . . . , vehicle 510(J−1), vehicle 510(J+1) . . . , and vehicle 510(N)) to update respective second ledger records at block 540. To that, the vehicle 510(J) can send a notification to the other vehicles to update the respective second ledger records. The notification can include, for example, hash data and an instruction to add the hash data to the respective second ledger data. Updating each one of the second ledger record(s) can result in the updated ledger record generated by, and retained at, the vehicle 510(J). In addition, the vehicle 510(J) can send the response message 435 to the ledger device 140.

With further reference to FIG. 4, the ledger device 150 can a second request message 450 to a third-party device 440 (e.g., one of the third-party service devices 195). The second request message 450 identifies a target transaction (e.g., a pizza delivery or a pet pickup). Thus, the second request message 450 is labeled "Transaction Request," for the sake of nomenclature. The second request message 450 can include user data identifying an intended recipient of a target product or target service corresponding to the target transaction. The second request message 450 also can include job data defining, at least partially, such a product or service.

The third-party device 440 can manage the execution of the target transaction. The ledger device 150 can permit, in some embodiments, the exchange of feedback messages 455 between the third-party device 440 and a user device 460 (e.g., the mobile device 105). In other embodiments, the ledger device 150 can optionally permit the exchange of the feedback messages 455 between the user device 460 and the vehicle that validated the job request 425 (e.g., such as vehicle 510(J) in the example shown in FIG. 5). The user device 460 corresponds to the intended recipient of the target product or the beneficiary of the target service task. In accordance with aspects described herein, the feedback messages 455 can permit completing the target order or target service task. The feedback messages 455 can include one or many requests for additional information regarding the target order or target service task. At least one of the feedback messages 455 can define one or more attributes of the target product or target service task.

Figure 6:
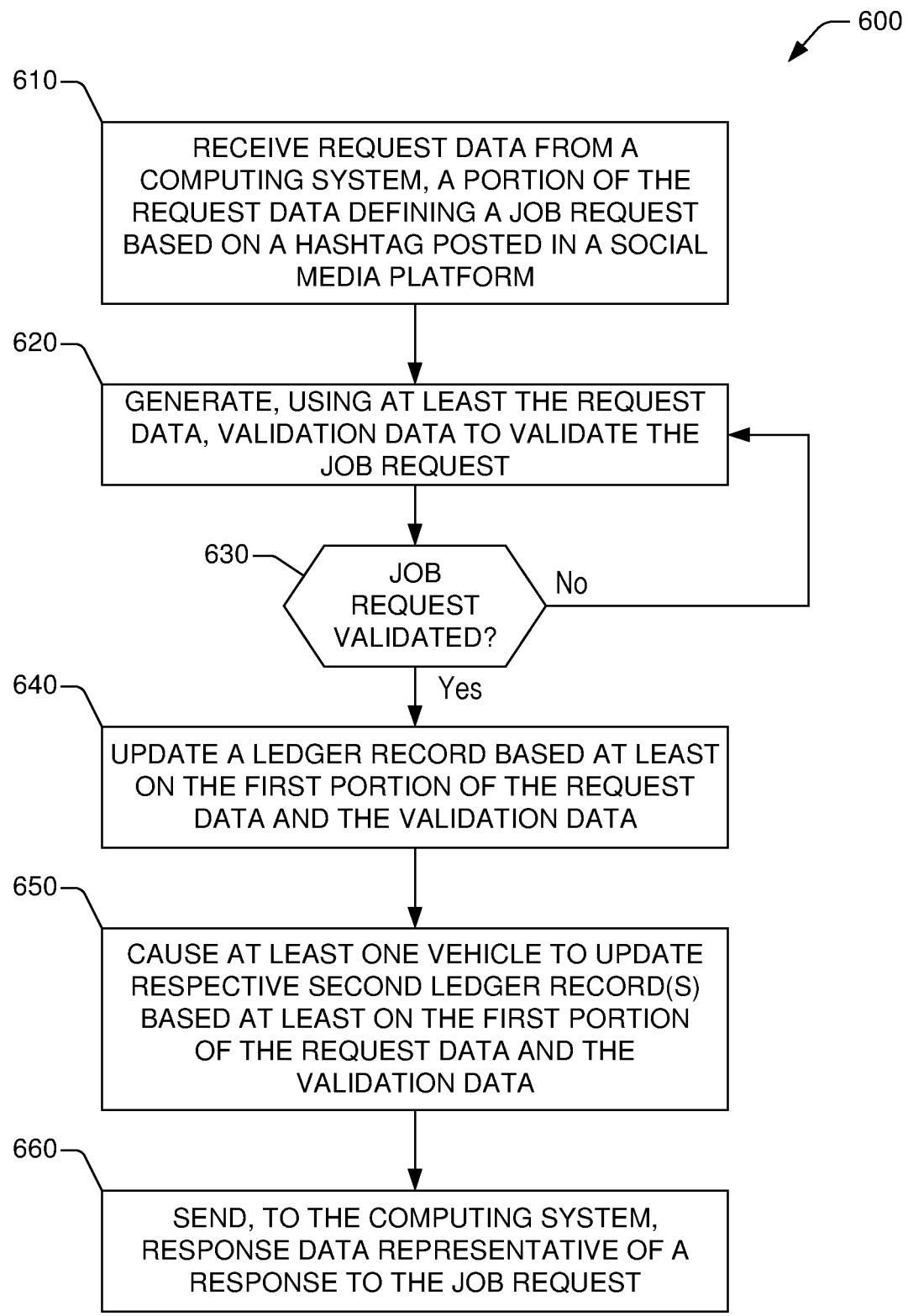
FIG. 6 presents an example of a method for automating the configuration of provision of a product or service, in accordance with one or more embodiments of this disclosure.

An example of another technique that can be implemented in accordance with this disclosure can be better appreciated with reference to FIG. 6. For purposes of simplicity of explanation, the exemplified method in FIG. 6 (and other techniques disclosed herein) are presented and described as a series of operations. It is noted, however, that the exemplified method and any other techniques of this disclosure are not limited by the order of operations. Some operations may occur in different order than that which is illustrated and described herein. In addition, or in the alternative, some operations can be performed essentially concurrently with other operations (illustrated or otherwise). Further, not all illustrated operations may be required to implement an exemplified method or technique in accordance with this disclosure. Furthermore, in some embodiments, two or more of the exemplified methods and/or other techniques disclosed herein can be implemented in combination with one another to accomplish one or more elements and/or technical improvements disclosed herein.

Techniques disclosed throughout the subject specification and annexed drawings are capable of being stored on an article of manufacture to facilitate transporting and transferring such methodologies to computers or other types of information processing machines or processing circuitry for execution, and thus implementation by a processor or for storage in a memory device or another type of computer-readable storage device. In one example, one or more processors that perform a method or combination of methods disclosed herein can be utilized to execute programming code instructions retained in a memory device or any computer-readable or machine-readable storage device or non-transitory storage media, to implement one or several of the techniques disclosed herein. The programming code instructions, when executed by the one or more processors can implement or carry out the various operations in the exemplified methods and/or other technique disclosed herein.

The programming code instructions, therefore, provide a computer-executable or machine-executable framework to implement the exemplified methods and/or other techniques disclosed herein. More specifically, yet not exclusively, each block of the flowchart illustrations and/or combinations of blocks in the flowchart illustrations can be implemented by the programming code instructions.

FIG. 6 presents an example of a method 600 for automating the configuration of delivery of a product or service, in accordance with one or more embodiments of this disclosure. A computing apparatus included in a vehicle (e.g., vehicle 170d) can implement, entirely or partially, the example method 600. In some embodiments, the computer apparatus is integrated into the vehicle. In other embodiments, the processing device or computer apparatus is functionally coupled to the vehicle. The computing apparatus can embody, or can constitute, the digital mining apparatus 180 (FIG. 1).

The computing apparatus has a processing device that includes or is functionally coupled to one or more processors, one or more memory devices, other types of computing resources, a combination thereof, or the like. Such processor(s), memory device(s), and computing resource(s), individually or in a particular combination, permit or otherwise facilitate implementing the example method 600. The computing resources can include operating systems (O/Ss); software for configuration and/or control of a virtualized environment; firmware; central processing unit(s) (CPU(s)); graphics processing unit(s) (GPU(s)); virtual memory; disk space; interface(s) (I/O interface devices, programming interface(s) (such as application programming interfaces (APIs), etc.); controller devices(s); power supplies; a combination of the foregoing; or the like. The computer apparatus can include or can be functionally coupled to a communication unit. The computing device permits the exchange of data, metadata, and/or signaling between the computer apparatus (or a component of the apparatus) and a computing device or an electronic device external to the computing apparatus. Thus, the computing resources available to the computing apparatus also can include downstream communication bandwidth and/or upstream communication bandwidth.

At block 610, the processing device included in the computing apparatus can receive request data from a computing system, a portion of the request data defining a job request (e.g., job request 420). The job request can be based on a hashtag (e.g., hashtag 114) posted in a social media platform. Such a portion of the request data includes job data and/or user data. In some embodiments, the job request can represent a blockchain transaction. The computing system can be remotely located relative to a vehicle that includes the processing device. The computing system can be embodied in, or can include, the one or more ledger devices 150 (FIG. 1). The computing system can permit implementing a transaction or managing the implementation of the transaction corresponding to the job request.

At block 620, the processing device included in the computing apparatus can generate, using at least the request data, validation data in an attempt to validate the job request. To that end, in some embodiments, the processing device can operate on the request data by applying a cryptographic hash function (e.g., RIPEMD-160, Secure Hash Algorithm (SHA)-1, SHA-256, SHA-512, or the like) to the request data, resulting in validation data that includes a particular hash value. The processing device can operate on the request data at defined time periods and/or within defined regions (or, in some instances, at defined locations).

At block 630, the processing device included in the computing apparatus can determine if the job request is validated. In accordance with aspects described herein, in one embodiment, the job request can be validated when the validation data satisfies a first validation criterion. In other embodiments, the job request can be validated when both the validation data satisfies the first validation criterion and the vehicle that includes the computing apparatus satisfies one or more second validation criteria.

In response to a negative determination, the processing device can continue generating validation data. In response to an affirmative determination, the flow of the example method 600 can continue to block 640, where the processing device can update a ledger record based at least on a combination of the validation data and one or more of the job data or the user data. The ledger record can be formatted as blockchain ledger data. Thus, updating the ledger record can include adding a block of data to a sequence (or chain) of blocks of data that constitute the ledger record.

At block 650, the processing device included in the computing apparatus can cause one or several vehicles to update respective second ledger record(s) based at least on the combination of the validation data and one or more of the job data or the user data. To that end, the processing device can send a notification to update the respective second ledger records to the one or several vehicles. The notification can include, for example, the validation data (e.g., a cryptographic hash) and the job data or the user data, or both. The notification also can include, in some configurations, an instruction to add the validation data and the job data and/or the user data to the respective second ledger record(s). In some implementations, the job data and/or the user data can be encrypted before being added to the respective second ledger record(s). Such vehicle(s) can constitute a group of vehicles (e.g., vehicles 510(1)-510(N), FIG. 5) that operate on the request data essentially concurrently with the vehicle that includes the processing device. Accordingly, causing a vehicle to update a second ledger record can include sending, to the vehicle, a notification indicative of the job request being validated, and directing the vehicle to add the hash value and one or more of the job data or the user data to the second ledger record.

At block 660, the processing device included in the computing apparatus can send response data to the computing system (e.g., the one or more ledger devices 150), the response data being representative of a response to the job request. The response data can include the validation data and one or more of the job data or the user data. The processing device can send the response data by means of the communication unit (e.g., communication unit 189, FIG. 1) that is either integrated into the computing apparatus or functionally coupled thereto.

Although not illustrated in FIG. 6, the example method 600 also can include a block at which feedback data corresponding to the validated job request can be sent to, received from, or exchanged with the computing system (or a device thereof). In one embodiment, the feedback data can be exchanged with the ledger device 150.

Figure 7:
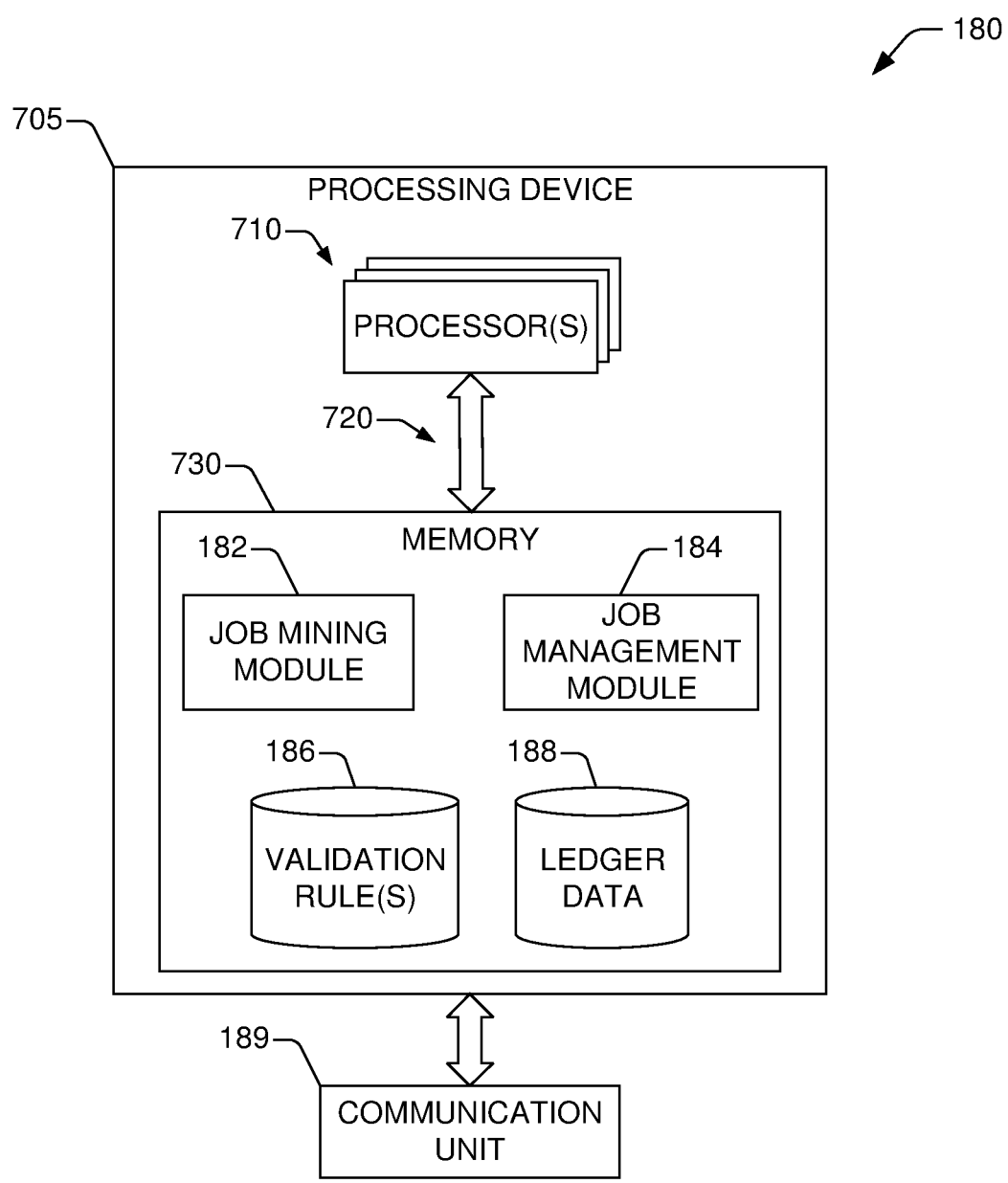
FIG. 7 presents an example of an apparatus for automated configuration of provision of a product or service, in accordance with one or more embodiments of this disclosure.

FIG. 7 is a block diagram of an example of an apparatus 700 for automated configuration of provision of a product or service, in accordance with one or more embodiments of the disclosure. The apparatus 700 can embody, or can constitute, the digital mining apparatus 180. Thus, as is illustrated, the apparatus includes a processing device 705 and the communication unit 189. The processing device 705 can embody, or can constitute, the control unit 181. In some embodiments, the processing device 705 and the communication unit 189 can be integrated into a vehicle (e.g., one of the vehicles in the peer network 160, FIG. 1). In other embodiments, the processing device 705 or the communication unit 189, or both, can be functionally coupled to such a vehicle. In yet other embodiments, the processing device 705 can be integrated into the vehicle and the communication unit 189 can be functionally coupled to the vehicle.

The processing device 705 can include one or more processors 710 and one or more memory devices 730 (referred to as memory 730) that include machine-accessible instructions (e.g., computer-readable and/or computer-executable instructions) that can be accessed and executed by at least one of the processor(s) 710. The processor(s) 710 can be embodied in, or can include, for example, a GPU; multiple GPUs; a CPU; multiple CPUs; an application-specific integrated circuit (ASIC); a microcontroller; a programmable logic controller (PLC); a field programmable gate array (FPGA); a combination thereof; or the like. In some embodiments, the processor(s) 710 can be arranged in a single computing device (e.g., an electronic control unit (ECU), an in-car infotainment (ICI) system, or the like). In other embodiments, the processor(s) 710 can be distributed across two or more computing devices (e.g., multiple ECUs; a combination of an ICI system and one or many ECUs; or the like).

The processor(s) 710 can be functionally coupled to the memory 730 by means of a communication architecture 720. The communication architecture 720 is suitable for the particular arrangement (localized or distributed) of the processor(s) 710. In some embodiments, the communication architecture 720 can include one or many bus architectures, such an Ethernet-based industrial bus, a controller area network (CAN) bus, a Modbus, other types of fieldbus architectures, a combination thereof, or the like.

As is illustrated in FIG. 7, the memory 730 includes the job mining module 182 and the job management module 184. Machine-accessible instructions embody or otherwise constitute each one of such modules. In some embodiments, the machine-accessible instructions are encoded in the memory 730 and can be arranged in components that can be built (e.g., linked and compiled) and retained in computer-executable form in the memory 730 (as is shown) or in one or more other machine-accessible non-transitory storage media. In other embodiments, the machine-accessible instructions can be assembled as circuitry or other types of hardware components.

At least one of the processor(s) 710 can execute, individually or in combination, the job mining module 182 and the job management module 184 to cause the processing device 705 to perform functions for automated control of provision of a product or service in accordance with this disclosure. The memory 730 also includes validation rule(s) 186 and ledger data 186 that can be utilized, individually or in combination, as part of the execution of at least one of such modules.

While not illustrated in FIG. 7, the processing device 705 also can include other types of computing resources that can permit or otherwise facilitate the execution of at least one of the job mining module 182 or the job management module 184. The computing resources can include, for example, several interfaces (such as I/O interfaces, APIs, and/or a wireless communication adapter or another type of wireless communication component). In addition, or as another example, the computing resource(s) can include controller devices(s), power supplies, an O/S, a firmware, a combination thereof, or the like.

Figure 8:
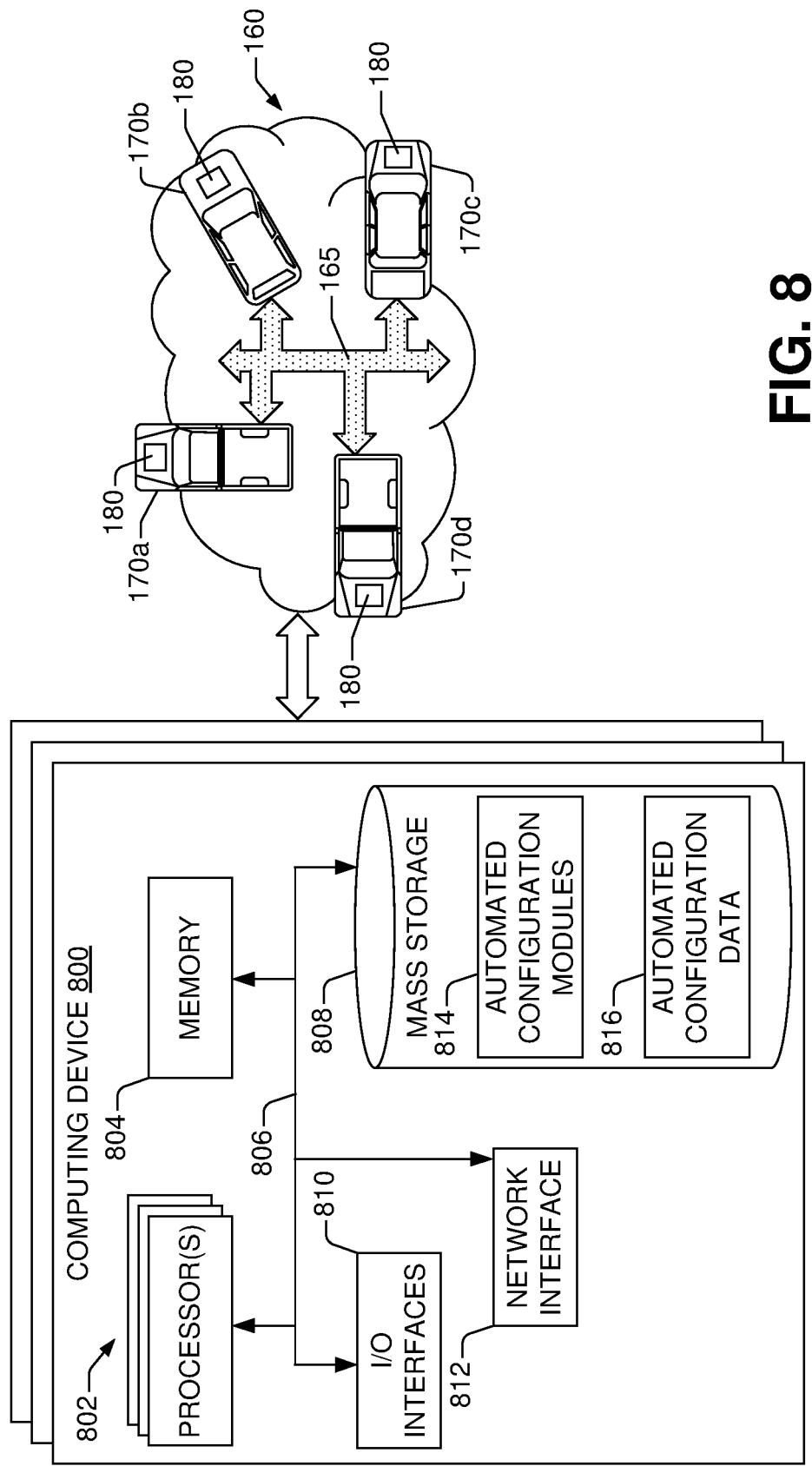
FIG. 8 presents an example of a computing environment for automated configuration of provision of a product or service, in accordance with one or more embodiments of this disclosure.

FIG. 8 illustrates a computing environment for the automated configuration of provision of a product or service, in accordance with one or more embodiments of this disclosure. The computing environment can include multiple computing devices 800 that can be used in accordance with aspects of this disclosure. A first combination of the computing devices 800 can embody the service automation device 140 and a second combination of the computing devices 800 can embody the ledger device 150. Each computing device 800 includes at least one processor 802 that executes instructions that are stored in one or more memory devices (referred to as memory 804). The instructions can be, for instance, instructions for implementing functionality described as being carried out by one or more modules and systems disclosed above or instructions for implementing one or more of the methods disclosed above. The processor(s) 802 can be embodied in, for example, a CPU, multiple CPUs, a GPU, multiple GPUs, a multi-core processor, a combination thereof, and the like. In some embodiments, the processor(s) 802 can be arranged in a single computing device. In other embodiments, the processor(s) 802 can be distributed across two or more computing devices (e.g., multiple CPUs; multiple GPUs; a combination thereof; or the like).

The processor(s) 802 can access the memory 804 by means of a communication architecture 806 (e.g., a system bus). The communication architecture 806 is suitable for the particular arrangement (localized or distributed) and type of the processor(s) 802. In some embodiments, the communication architecture 806 can include one or many bus architectures, such as a memory bus or a memory controller; a peripheral bus; an accelerated graphics port; a processor or local bus; a combination thereof; or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCM-CIA) bus, a Universal Serial Bus (USB), and or the like.

In addition to storing executable instructions, the memory 804 also can retain one or a combination of hashtag activity data, formatting rules, configuration data, transaction data, etc. The type of data retained in the memory 804 can be based on the functionality of the computing device 800. First types of data can be retained in the memory 804 in instances in which the computing device 800 embodies or constitutes the service automation device 140. Second types of data can be retained in the memory 804 in instances in which the computing device 800 embodies or constitutes the ledger device 150.

Each computing device 800 additionally can include mass storage 808 that is accessible by the processor(s) 802 by means of the communication architecture 806. The mass storage 808 can include machine-accessible instructions (e.g., computer-readable instructions and/or computer-executable instructions). In some embodiments, the machine-accessible instructions are encoded in the mass storage 808 and can be arranged in components that can be built (e.g., linked and compiled) and retained in computer-executable form in the mass storage 808 or in one or more other machine-accessible non-transitory storage media included in the computing device 800. Such components can embody, or can constitute, one or more of the various modules disclosed herein. Such modules are illustrated as automated configuration modules 814. Accordingly, in some embodiments, the automated configuration modules 814 can include the detection module 204, the hashtag normalization module 208, and the job requestor module 212. In other embodiments, the automated configuration modules 814 can include the node management module 304, the transaction management module 308, the feedback module 312, and the payment processor module 316.

Execution of the automated configuration modules 814, individually or in combination, by at least one of the processor(s) 802, can cause the computing device 800 to provide at least some of the functionality disclosed herein for automation of configuration of a product or a service. For instance, execution of the automated configuration modules 814, individually or in combination, can cause the computing device 800 implement one or more of the techniques disclosed herein.

The mass storage 808 also can retain data that can be utilized to implement the functionality disclosed herein for automation of configuration of a product or a service or that can result from the implementation of such functionality. Such data are illustrated as automated configuration data 816 and can include, for example, one or a combination of hashtag activity data, formatting rules, configuration data, various types of transaction data, and the like.

Each computing device 800 also can include one or more input/output interface devices 810 (referred to as I/O interface 810) that can permit or otherwise facilitate external devices to communicate with the computing device 800. For instance, the I/O interface 810 may be used to receive and send data and/or instructions from and to an external computing device. The computing device 800 also includes one or more network interface devices 812 (referred to as network interface(s) 812) that can permit or otherwise facilitate functionally coupling the computing device 800 with one or more external devices. Functionally coupling the computing device 800 to an external device can include establishing a wireline connection or a wireless connection between the computing device 800 and the external device. For example, the computing device 800 can send data, metadata, and/or signaling wirelessly to one or more vehicles in the vehicular peer network 160 by means of at least one of the network interface(s) 812.

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (e.g., data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electro-mechanical coupling mechanisms (such as conduits, connectors, combinations thereof, or the like). An interface can include input/output (I/O) components as well as associated processors, applications, and/or other programming components.

As is utilized in this disclosure, the term "processor" can refer to any type of processing circuitry or device. A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory.

Additionally, or as another example, a processor can refer to an integrated circuit (IC), an ASIC, a digital signal processor (DSP), a FPGA, a PLC, a complex programmable logic device (CPLD), a discrete gate or transistor logic, discrete hardware components, or any combination thereof designed or otherwise configured (e.g., manufactured) to perform the functions described herein.

In some embodiments, processors can utilize nanoscale architectures in order to optimize space usage or enhance the performance of systems, devices, or other electronic equipment in accordance with this disclosure. For instance, a processor can include molecular transistors and/or quantum-dot based transistors, switches, and gates.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The flowchart and block diagrams in the figures illustrate the architecture, functionality, and operation of possible implementations of examples of systems, methods, and computer program products according to various embodiments of the present disclosure. In this regard, each block in the flowchart or block diagrams may represent a module, segment, or portion of instructions, which includes one or more machine- or computer-executable instructions for implementing the specified operations. It is noted that each block of the block diagrams and/or flowchart illustration, and combinations of blocks in the block diagrams and/or flowchart illustration, can be implemented by special purpose hardware-based systems that perform the specified functions or operations or carry out combinations of special purpose hardware and computer instructions.

Computer-readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable non-transitory storage medium within the respective computing/processing device.

What has been described herein in the present specification and annexed drawings includes examples of systems, devices, techniques, and computer program products that, individually and in combination, permit the automated configuration of provision of a product or service. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. A method, comprising:
receiving, by a processing device integrated into a vehicle, first request data from a computing system remotely located relative to the vehicle, a first portion of the first request data defining a first job request based on a hashtag posted in a social media platform, wherein the first portion of the first request data includes first job data identifying a target transaction corresponding to the first job request and user data identifying a job requestor;
determining, based on a semantic category of the hashtag and using a convolutional neural network, a normalized hashtag, wherein the first job request is generated based at least on a first job type associated with the normalized hashtag;
generating, using the first request data, a hash value to validate the first job request;
determining that the first job request is validated using at least the hash value;
updating a first ledger record of a first ledger based at least on the hash value, the first job data, and the user data;
causing multiple second vehicles to update respective second ledger records of a second ledger based at least on the hash value, the first job data, and the user data; each one of the updated respective second ledger records corresponding to the updated first ledger record, wherein the first ledger and second ledger are associated with a first vehicle associated with the first job type;
sending response data to the computing system, the response data representing a response to the first job request and including the hash value, the first job data, and the user data;
transmitting a request message associated with the target transaction to a service device, wherein the service device is configured to manage execution of the target transaction;
receiving, by the processing device, second request data defining a second job request, wherein the second job request is generated based at least on a second job type associated with a second normalized hashtag; and
updating a third ledger record, wherein the third ledger record is added to a third ledger, wherein third ledger is associated with a second vehicle associated with the second job type, and wherein the third ledger is different than the first ledger and second ledger.

2. The method of claim 1, wherein the updating the first ledger record comprises,
encrypting at least one of the first job data or the user data;
generating a block of data including the hash value and one or more of the encrypted job data or the encrypted user data; and adding the block of data to the first ledger record.

3. The method of claim 1, wherein the causing comprises,
sending, to a first one of the multiple second vehicles, a notification indicative of the first job request being validated, the notification including the hash value and one or more of the first job data or the user data, wherein validation of the first job request comprises the hash value satisfying a validation criterion; and
directing the first one of the multiple second vehicles to add the hash value and the one or more of the first job data or the user data to the second ledger.

4. The method of claim 1, wherein the first job request has a defined type corresponding to the semantic category of the hashtag.

5. The method of claim 1, further comprising operating on the first request data during at least one of operation of the vehicle within a defined region or operation of the vehicle at a defined location.

6. The method of claim 1, wherein the target transaction comprises delivery of a product, the method further comprising receiving, by the processing device, feedback data from the computing system, the feedback data defining at least one attribute of the product and comprising a request for information regarding the product.

7. The method of claim 1, wherein the target transaction comprises execution of a service task, the method further comprising receiving, by the processing device, feedback data from the computing system, the feedback data defining at least one attribute of the service task and comprising a request for information regarding a product.

8. The method of claim 1, wherein determining the normalized hashtag comprises at least one of: removing a character of the hashtag or performing a spelling correction.

9. A vehicle, comprising:
an apparatus comprising,
at least one processor; and
at least one memory device functionally coupled to the at least one processor, the at least one memory device having instructions encoded thereon that, in response to execution by the at least one processor, cause the apparatus to perform or facilitate operations comprising:
receiving first request data from a computing system remotely located relative to the vehicle, a first portion of the request data defining a first job request based on a hashtag posted in a social media platform, wherein the first portion of the first request data includes first job data identifying a target transaction corresponding to the first job request and user data identifying a job requestor;
determining, based on a semantic category of the hashtag and using a convolutional neural network, a normalized hashtag, wherein the first job request is generated based at least on a first job type associated with the normalized hashtag;
generating, using the request data, a hash value to validate the first job request; determining that the first job request is validated using at least the hash value;
updating a first ledger record of a first ledger based at least on the hash value, the first job data, and the user data;
causing a second vehicle to update a second ledger record of a second ledger based at least on the hash value, the first job data, and the user data; the updated second ledger record corresponding to the updated first ledger record, wherein the first ledger and second ledger are associated with a first vehicle associated with the first job type;
sending response data to the computing system, the response data representing a response to the first job request and including the hash value, the first job data, and the user data;
transmit a request message associated with the target transaction to a service device, wherein the service device is configured to manage execution of the target transaction;

receive second request data defining a second job request, wherein the second job request is generated based at least on a second job type associated with a second normalized hashtag; and update a third ledger record, wherein the third ledger record is added to a third ledger, wherein third ledger is associated with a second vehicle associated with the second job type, and wherein the third ledger is different than the first ledger and second ledger.

10. The vehicle of claim 9, wherein the updating the first ledger record comprises, encrypting at least one of the first job data or the user data;

generating a block of data including the hash value and one or more of the encrypted job data or the encrypted user data; and adding the block of data to the first ledger record.

11. The vehicle of claim 10, wherein the causing comprises, sending, to the second vehicle, a notification indicative of the first job request being validated, the notification including the hash value and one or more of the first job data or the user data, wherein validation of the first job request comprises the hash value satisfying a validation criterion; and directing the second vehicle to add the hash value and the one or more of the first job data or the user data to the second ledger record.

12. The vehicle of claim 9, wherein the first job request has a defined type corresponding to the semantic category of the hashtag.

13. The vehicle of claim 9, wherein the generating comprises operating on the request data in a defined period during operation of the vehicle, and wherein the generating comprises operating on the first request data during at least one of operation of the vehicle within a defined region or operation of the vehicle at a defined location.

14. The vehicle of claim 9, wherein the target transaction delivery of a product, the operations further comprising receiving feedback data from the computing system, the feedback data defining at least one attribute of the product and comprising a request for information regarding the product.

15. The vehicle of claim 9, wherein the target transaction comprises performance of a service task, the operations further comprising receiving feedback data from the computing system, the feedback data defining at least one attribute of the service task and comprising a request for information regarding a product.

16. An apparatus, comprising:

at least one processing device that executes instructions to cause the apparatus to perform or facilitate operations comprising, receiving first request data from a computing system remotely located relative to a vehicle, a first portion of the first request data defining a first job request based on a hashtag posted in a social media platform, wherein the first portion of the first request data includes first job data identifying a target transaction corresponding to the first job request and user data identifying a job requestor;

determining, based on a semantic category of the hashtag and using a convolutional neural network, a normalized hashtag, wherein the first job request is generated based at least on a first job type associated with the normalized hashtag;

generating, using the first request data, a hash value to validate the first job request;

determining that the first job request is validated using at least the hash value;

updating a first ledger record of a first ledger based at least on the hash value, the first job data, and the user data;

causing a second vehicle to update a second ledger record of a second ledger based at least on the hash value, the first job data, and the user data; the updated second ledger record corresponding to the updated first ledger record, wherein the first ledger and second ledger are associated with a first vehicle associated with the first job type;

sending response data to the computing system, the response data representing a response to the first job request and including the hash value, the first job data, and the user data; and transmitting a request message associated with the target transaction to a service device, wherein the service device is configured to manage execution of the target transaction;

receiving second request data defining a second job request, wherein the second job request is generated based at least on a second job type associated with a second normalized hashtag; and updating a third ledger record, wherein the third ledger record is added to a third ledger, wherein third ledger is associated with a second vehicle associated with the second job type, and wherein the third ledger is different than the first ledger and second ledger.

17. The apparatus of claim 16, wherein the causing comprises, sending, to the second vehicle, a notification indicative of the first job request being validated, the notification including the hash value and one or more of the first job data or the user data, wherein validation of the first job request comprises the hash value satisfying a validation criterion; and directing the second vehicle to add the hash value and the one or more of the first job data or the user data to the second ledger record.

18. The apparatus of claim 16, wherein the target transaction comprises delivery of a product, the operations further comprising receiving feedback data from the computing system, the feedback data defining at least one attribute of the product and comprising a request for information regarding the product.

19. The apparatus of claim 16, wherein the target transaction comprises performance of a service task, the operations further comprising receiving feedback data from the computing system, the feedback data defining at least one attribute of the service task and comprising a request for information regarding a product.

* * * * *